Patented Sept. 26, 1939

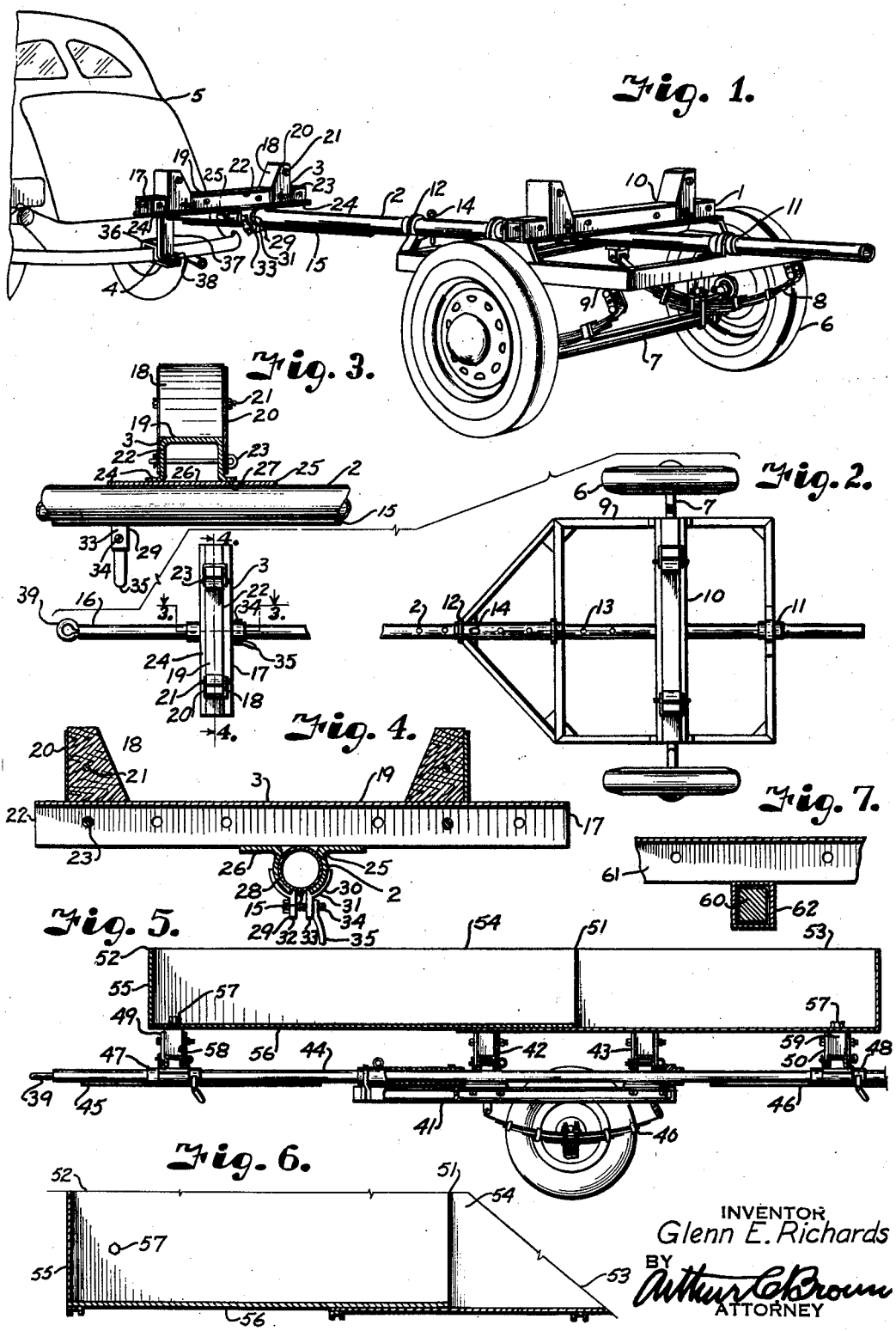

2,174,063

UNITED STATES PATENT OFFICE 2,174,063

TRAILER

Glenn E. Richards, Kansas City, Mo.

Application January 8, 1938, Serial No. 184,110

6 Claims. (Cl. 280—33.4)

This invention relates to trailers and more particularly to a trailer provided with an adjustable bolster.

In the present trailer construction, it is customary to provide a truck or trucks for supporting one end of a load, the other end of the load being carried by a trailer tractor. Special tractor constructions are usually employed for supporting the draft end of the trailer and the tractors are ordinarily limited in use to drawing the trailer.

It is the principal object of the present invention to provide a trailer capable of being drawn by any type of tractor and which is also adapted to be drawn by a passenger vehicle.

A further very important object of the present invention is to provide an adjustable bolster for the trailer reach for supporting the forward ends of loads carried by the trailer, thereby relieving the towing vehicle of that duty and permitting the towing vehicle to be used for other purposes even though a loaded trailer is attached thereto.

Other important objects of the present invention are to so arrange the adjustable bolster on the reach as to equalize and balance the weight of loads carried on the trailer; to provide for maintaining the bolster in operative horizontal condition; to provide improved devices and arrangements of devices for so mounting the adjustable bolster on the trailer reach; to provide an adjustably extensible body member for the trailer; and to provide various forms of trailer reaches and adjustable bolsters capable of carrying out the purpose of the present invention.

In accomplishing these and other objects of the present invention I have provided improved details of structure, the preferred forms of which are illustrated in the accompanying drawing, wherein:

Fig. 1 is a perspective view of a trailer and tractor, the trailer being provided with an adjustable bolster embodying the features of the present invention.

Fig. 2 is a plan view of the trailer, the reach being broken to compact the structure.

Fig. 3 is a detail vertical cross-section through the adjustable bolster on the line 3—3, Fig. 2.

Fig. 4 is a transverse section through the adjustable bolster on the line 4—4, Fig. 2.

Fig. 5 is a longitudinal cross-section through a modified form of trailer illustrating an adjustably extensible body member mounted on the trailer.

Fig. 6 is a fragmentary longitudinal cross-section through the adjustably extensible trailer body member.

Fig. 7 is a detail transverse section through a bolster and a modified form of reach illustrating the application of the bolster to the reach.

Referring more in detail to the drawing:

The invention preferably includes a semi-trailer comprising a bolstered truck 1 having a reach 2, the reach being provided with an adjustable bolster 3 and a draft element 4 engaged with a tractor 5.

The term "semi-trailer" is herein intended to refer to trailers provided with a single truck supporting the rear end thereof, as distinguished from conventional trailers having a plurality of trucks for supporting both ends thereof.

The truck 1 is substantially conventional and consists of wheels 6 suitably mounted on an axle 7, the axle being provided with springs 8 for resiliently supporting a frame 9, the frame 9 being provided with a conventional transverse bolster 10 or a plurality of bolsters 10 if desired. The ends of the frame are provided with sleeves 11 and 12 engaged about the reach 2 for adjustably mounting the truck on the reach, and the reach is preferably provided with holes or the like 13 for receiving a stop member 14 such as a pin to limit relative movements between the truck and the reach.

The forward end of the reach is provided with the adjustable bolster 3 and as an illustration of a manner which I have found suitable for affixing the bolster to the reach, the reach may be provided with a track 15 preferably on the under side thereof and preferably in the form of a bar or the like extending longitudinally of the reach from adjacent the forward end 16 of the reach rearwardly a substantial distance. The bolster 3 preferably includes a transverse headpiece 17, Fig. 4, which is preferably of channel shape having spaced block members 18 mounted on the web 19 of the channel and provided with supporting plates 20 engaged with the blocks and fixed thereto as at 21 and to the flanges 22 of the channel as at 23, Fig. 3, preferably by means of pins extending through pairs of spaced aligned perforations in the side flanges of the channel, thereby rendering the blocks laterally adjustable on the bolster.

The flanges 22 of the channels are provided with laterally turned side edges 24 to provide supporting surfaces for spaced bracket members 25, the bracket members preferably being provided with base flanges 26 which are suitably fixed as by welding or the like to the under faces 27 of the edges 24 of the channel flanges as particularly shown in Fig. 3. The bracket members 25 further include arcuately shaped side flanges 28, the end edges of which are preferably spaced from each other to provide surfaces on which to fix a clamping member 29.

The clamping member 29 preferably consists of arcuately shaped side plates 30 which are suitably fixed to the outer faces of the arcuate side flanges 28 of the brackets 25, the clamping member having longitudinally disposed bosses 31 engageable between and fixed to the respective edges of the arcuate bracket flanges, as shown in Fig. 4. Spaced and aligned ears 32 and 33 are provided at the ends of the clamping member side plates and a bolt or the like 34 is passed through aligned perforations in the ears, the bolt preferably being threaded to receive a handle 35 thereon in such a manner that as the handle is turned upon the threads of the bolt, the ears 32 and 33 are drawn together to draw the bracket flanges 28 together thereby clamping the bolster to the reach.

In order to facilitate this clamping action, the bar 15 on the reach is adapted to be engaged by the bosses 31 on the sleeve clamp for limiting rocking motion of the bolster 3 relative to the reach.

The draft element 4 preferably consists of a bracket 36, Fig. 1, suitably mounted at the rear of the tractor 5 which in the present instance is shown as a passenger vehicle and a coupling member 37 is mounted on the bracket 36 as by fastening devices 38, the coupling 37 extending upwardly from the bracket and being suitably engaged with an eye 39 or the like, Fig. 2, for drawing the trailer in a tracking manner along the path of travel of the vehicle.

The operation of a trailer constructed as described is as follows:

Any type of tractor 5 may be provided with the draft element 4 in a suitable manner as for example by the attachment thereof to the rear bumper of the vehicle, as shown. The forward end of the reach is then connected to the draft element and the trailer may then be towed to any desired location. When it is desired to apply a load to the trailer, the type of load is taken into consideration and if the load consists of pipes for example, the approximate length thereof is ascertained. The bolster 3 is then adjusted upon the reach by loosening the clamp 29 and the bolster is slid on the reach along the track 15 to a position suitable for supporting and/or balancing the forward ends of the pipes, the rear ends of the pipes being supported on the truck bolster 10. The bolster 3 is then clamped in position by manipulating the handle 35 of the clamp and suitable tying elements may be employed for tying the pipes to the trailer. The truck 1 may be adjusted relative to the reach by removing the pin 14 and sliding the truck on the reach, thereafter reinserting the pin to prevent sliding movement of the truck on the reach.

It is apparent that the load may be wholly supported on a trailer embodying the features of this invention and that the tractor may be employed for any of its normal uses even while drawing the trailer.

In Fig. 5, a modified form of the present invention is illustrated wherein a truck 40 is provided having a frame 41 resiliently mounted thereon. A pair of bolsters 42 and 43 are mounted on the frame and the frame is adapted for adjustment longitudinally on a reach 44. The opposite ends of the reach are, in this instance, preferably provided with tracks 45 and 46 for engaging portions of the sleeves 47 and 48 mounted on bolsters 49 and 50, each of which bolsters is substantially similar to the bolster 3 described in connection with the preferred form of invention and are adapted to be adjustably mounted on the reach in substantially the same manner.

In this modified form of invention an extensible truck body 51 is mounted on the truck and adjustable bolsters, the truck body preferably consisting of telescoping front and rear members 52 and 53, each having side, end and bottom walls 54, 55 and 56, respectively. The bottom walls of the body are preferably fixed, as by fastening devices 57, to the blocks 58 and 59 of the adjustable bolsters and the bottom wall of one of the body members slidably seats on the top face of the bottom wall of the other body member, the lower supporting bottom wall being slidably mounted on the bolsters 42 and 43 on the truck 40.

In operation, the type of load being determined, the trailer is drawn in a suitable manner to the load and the body is telescopingly adjusted longitudinally relative to the reach 44 by adjusting the bolsters 49 and 50 in such a manner that the weight of the load may be distributed over the body and balanced on the truck. The trailer may thus be drawn as a separate unit irrespective of the type of tractor and a minimum of strain is placed on the tractor.

In Fig. 7 a modified form of reach and bolster sleeve is illustrated wherein the reach 60 is of substantially rectangular cross-section. The bolster 61 may be of suitable construction, but is provided with a sleeve 62 of substantially rectangular cross-section and of a size adapting it for sliding fit on the reach. While it is contemplated that longitudinal movement of the bolster on the reach is to be limited as by tie members, not shown, for example as by a pin similar to the pin 14 of the preferred form of invention, it is not necessary to make especial provision to prevent rocking of the bolster for the reason that the engagement of the relative corners of the reach and sleeve hold the bolster in substantially horizontal position and in operative condition to carry loads.

While certain forms of structure are illustrated and described for rendering the bolsters adjustable on the trailer reach, those forms are intended to be illustrative only and other forms may be employed for this purpose.

The principal advantages in a trailer embodying the features of the present invention are that the trailer is adapted to be towed by any form of tractor, including pleasure or passenger vehicles, the tractor thereby being permitted to perform its ordinary functions in addition to towing the trailer. The load on the trailer may be distributed to balance and in a sense equalize the load to thereby decrease the strains on the draft element and tractor. Less power is required to tow a trailer of this character and the wear and tear on the tractor is diminished.

What I claim and desire to secure by Letters Patent is:

1. In combination with a trailer truck and a reach, a track on the reach, a bolster, means on the bolster engaged with the track for adjustably mounting the bolster on the reach relative to the truck, and means for clamping the bolster in fixed position on the reach.

2. In combination with a semi-trailer including a reach having a truck frame substantially at its rear end and having an attaching forward end, a bolster, a sleeve on the bolster slidably mounted on the reach, and means on the sleeve engageable with the reach for fixing the bolster in posiiton on the reach in forwardly spaced longitudinal relation to said truck frame and in rearwardly spaced relation to said forward attaching end of the reach.

3. In combination with a trailer reach, a bolster, a sleeve on the bolster slidably mounted on the reach, a clamping member on the sleeve engageable with the reach for fixing the bolster in position on the reach, and means on the reach engageable by the sleeve and clamping member for maintaining the bolster in substantially horizontal position on the reach.

4. In combination with trailer trucks having a reach, a telescoping body member mounted on the trucks, spaced bolsters adjustably mounted on the reach and supporting opposite ends of the body member, cooperative members on the reach and bolsters for maintaining the bolsters in alignment with each other, and clamping members on the bolsters engageable with the reach for maintaining the bolsters in adjusted positions.

5. In combination with trailer trucks having a reach, spaced bolsters adjustably mounted on the reach, cooperative members on the reach and bolsters for maintaining the bolsters in alignment with each other, and clamping members on the bolsters engageable with the reach for maintaining the bolsters in adjusted positions.

6. A semi-trailer including a reach, a truck mounted on one end of the reach, a bolster mounted on the other end of the reach and supported solely thereby, a track on the reach, and means on the bolster engaged with the track adjustably mounting the bolster on the reach relative to the truck.

GLENN E. RICHARDS.